United States Patent
Sitkiewitz et al.

(10) Patent No.: US 12,103,874 B2
(45) Date of Patent: *Oct. 1, 2024

(54) ULTRAVIOLET LIGHT ACTIVATED OXIDATION PROCESS FOR THE REDUCTION OF ORGANIC CARBON IN SEMICONDUCTOR PROCESS WATER

(71) Applicant: Evoqua Water Technologies LLC, Pittsburgh, PA (US)

(72) Inventors: Steve D. Sitkiewitz, Sebastopol, CA (US); Gary M. Carmignani, Occidental, CA (US); Lee W. Frederick, Bodega Bay, CA (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 248 days.

This patent is subject to a terminal disclaimer.

(21) Appl. No.: 17/461,262

(22) Filed: Aug. 30, 2021

(65) Prior Publication Data

US 2021/0387878 A1     Dec. 16, 2021

Related U.S. Application Data

(63) Continuation of application No. 16/739,071, filed on Jan. 9, 2020, now abandoned, which is a continuation
(Continued)

(51) Int. Cl.
*C02F 1/72*     (2023.01)
*C02F 1/32*     (2023.01)
(Continued)

(52) U.S. Cl.
CPC .............. *C02F 1/722* (2013.01); *C02F 1/325* (2013.01); *C02F 1/20* (2013.01); *C02F 1/42* (2013.01);
(Continued)

(58) Field of Classification Search
CPC ...... C02F 1/00; C02F 1/20; C02F 1/72; C02F 1/42; C02F 1/469; C02F 1/32; C02F 1/44;
(Continued)

(56) References Cited

U.S. PATENT DOCUMENTS

| | | |
|---|---|---|
| 2,008,684 A | 7/1935 | Craddock |
| 2,212,260 A | 8/1940 | Brothman |

(Continued)

FOREIGN PATENT DOCUMENTS

| | | |
|---|---|---|
| CA | 10-79423 A1 | 6/1980 |
| CN | 1098960 | 2/1995 |

(Continued)

OTHER PUBLICATIONS

Solarchem Environmental Systems, "The UV/Oxidation Handbook," 1994.
(Continued)

*Primary Examiner* — Akash K Varma

(57) ABSTRACT

In a system for decomposing organic compounds in water for use in semiconductor manufacturing, a chemical reactor vessel having a fluid inlet and a fluid outlet, a persulfate anion addition system upstream of the reactor vessel, and a light emitting device contained within the reactor vessel. The light emitting device provides light capable of decomposing persulfate anions.

13 Claims, 3 Drawing Sheets

Related U.S. Application Data of application No. 16/504,942, filed on Jul. 8, 2019, now Pat. No. 10,550,020, which is a continuation of application No. 14/169,928, filed on Jan. 31, 2014, now Pat. No. 10,343,939, which is a continuation-in-part of application No. 12/303,596, filed as application No. PCT/US2007/070416 on Jun. 5, 2007, now Pat. No. 8,652,336.

(60) Provisional application No. 60/811,220, filed on Jun. 6, 2006.

(51) Int. Cl.
| | |
|---|---|
| C02F 1/20 | (2023.01) |
| C02F 1/42 | (2023.01) |
| C02F 1/44 | (2023.01) |
| C02F 1/469 | (2023.01) |
| C02F 1/66 | (2023.01) |
| C02F 103/04 | (2006.01) |
| C02F 103/34 | (2006.01) |

(52) U.S. Cl.
CPC ............. *C02F 1/441* (2013.01); *C02F 1/444* (2013.01); *C02F 1/4695* (2013.01); *C02F 1/66* (2013.01); *C02F 2103/04* (2013.01); *C02F 2103/346* (2013.01); *C02F 2209/001* (2013.01); *C02F 2209/003* (2013.01); *C02F 2209/20* (2013.01)

(58) Field of Classification Search
CPC .......... C02F 1/008; C02F 1/325; C02F 1/722; C02F 1/441; C02F 1/444; C02F 1/4694; C02F 1/4695; C02F 1/66; C02F 2103/04; C02F 2103/346; C02F 2209/001; C02F 2209/003; C02F 2209/20; C02F 2101/32; C02F 9/00; B24B 57/00; B24B 57/02; B24B 1/00; B08B 3/14; A62D 3/176; A62D 2101/20
USPC ................... 210/96.2, 96.1; 451/36, 60, 446
See application file for complete search history.

(56) References Cited

U.S. PATENT DOCUMENTS

| | | | |
|---|---|---|---|
| 2,249,263 | A | 7/1941 | Wheelwright, Jr. |
| 2,268,461 | A | 12/1941 | Nichols |
| 2,556,014 | A | 6/1951 | Tolman |
| 2,651,582 | A | 9/1953 | Courtney |
| 2,686,110 | A | 8/1954 | Carver |
| 2,740,696 | A | 4/1956 | Longwell |
| 2,833,624 | A | 5/1958 | Sprauer |
| 3,252,689 | A | 5/1966 | Blomgren, Sr. et al. |
| 3,319,937 | A | 5/1967 | Wilson et al. |
| 3,389,970 | A | 6/1968 | Scheibel |
| 3,536,646 | A | 10/1970 | Hatch et al. |
| 3,559,959 | A | 2/1971 | Davis et al. |
| T896,051 | I4 | 3/1972 | Hamlin |
| 3,702,298 | A | 11/1972 | Zsoldos et al. |
| 3,742,735 | A | 7/1973 | Verreyne et al. |
| 3,747,899 | A | 7/1973 | Latinen et al. |
| 3,756,570 | A | 9/1973 | Buhner |
| 3,794,817 | A | 2/1974 | Shinskey |
| 3,852,234 | A | 12/1974 | Venema |
| 3,870,631 | A | 3/1975 | Fassell et al. |
| 3,965,027 | A | 6/1976 | Boffardi et al. |
| 4,016,078 | A | 4/1977 | Clark |
| 4,087,360 | A | 5/1978 | Faust et al. |
| 4,113,688 | A | 9/1978 | Pearson |
| 4,125,574 | A | 11/1978 | Kastner et al. |
| 4,146,676 | A | 3/1979 | Saeman et al. |
| 4,171,166 | A | 10/1979 | Trowbridge et al. |
| 4,217,145 | A | 8/1980 | Gaddis |
| 4,218,147 | A | 8/1980 | Rosenberger |
| 4,233,265 | A | 11/1980 | Gasper |
| 4,234,440 | A | 11/1980 | Hirozawa et al. |
| 4,241,016 | A | 12/1980 | Hirozawa et al. |
| 4,243,636 | A | 1/1981 | Shiraki et al. |
| 4,277,438 | A * | 7/1981 | Ejzak ................... G01N 31/005 422/186 |
| 4,280,912 | A | 7/1981 | Berry, III et al. |
| 4,300,909 | A | 11/1981 | Krumhansl |
| 4,340,489 | A | 7/1982 | Adams et al. |
| 4,402,836 | A | 9/1983 | Fochtman et al. |
| 4,433,701 | A | 2/1984 | Cox et al. |
| 4,456,512 | A | 6/1984 | Bieler et al. |
| 4,470,907 | A | 9/1984 | Sencza |
| 4,522,502 | A | 6/1985 | Brazelton |
| 4,550,011 | A | 10/1985 | McCollum |
| 4,575,678 | A | 3/1986 | Hladky |
| 4,581,074 | A | 4/1986 | Mankina et al. |
| 4,648,043 | A | 3/1987 | O'Leary |
| 4,664,528 | A | 5/1987 | Rodgers et al. |
| 4,701,055 | A | 10/1987 | Anderson |
| 4,719,252 | A | 1/1988 | Dutton et al. |
| 4,747,978 | A | 5/1988 | Loehr et al. |
| 4,752,740 | A | 6/1988 | Steininger |
| 4,798,702 | A | 1/1989 | Tucker |
| 4,830,721 | A | 5/1989 | Bianchi et al. |
| 4,863,608 | A | 9/1989 | Kawai et al. |
| 4,868,127 | A | 9/1989 | Blades et al. |
| 4,913,822 | A | 4/1990 | Chen et al. |
| 4,952,376 | A | 8/1990 | Peterson |
| 4,965,016 | A | 10/1990 | Saitoh et al. |
| 4,977,292 | A | 12/1990 | Hwa et al. |
| 4,990,260 | A | 2/1991 | Pisani |
| 5,000,866 | A | 3/1991 | Woyciesjes |
| 5,004,549 | A | 4/1991 | Wood et al. |
| 5,018,871 | A | 5/1991 | Brazelton et al. |
| 5,024,766 | A | 6/1991 | Mahmud |
| 5,030,334 | A | 7/1991 | Hale |
| 5,032,218 | A | 7/1991 | Dobson |
| 5,061,456 | A | 10/1991 | Brazelton et al. |
| 5,069,885 | A | 12/1991 | Ritchie |
| 5,073,268 | A | 12/1991 | Saito et al. |
| 5,112,521 | A | 5/1992 | Mullins et al. |
| 5,116,509 | A | 5/1992 | White |
| 5,118,422 | A | 6/1992 | Cooper et al. |
| 5,130,033 | A | 7/1992 | Thornhill |
| 5,135,968 | A | 8/1992 | Brazelton et al. |
| 5,139,627 | A | 8/1992 | Eden et al. |
| 5,164,429 | A | 11/1992 | Brazelton et al. |
| 5,213,694 | A | 5/1993 | Craig |
| 5,230,822 | A | 7/1993 | Kamel et al. |
| 5,236,602 | A | 8/1993 | Jackson |
| 5,239,257 | A | 8/1993 | Muller et al. |
| 5,256,307 | A | 10/1993 | Bachhofer et al. |
| 5,262,963 | A | 11/1993 | Stana et al. |
| 5,302,356 | A | 4/1994 | Shadman et al. |
| 5,306,355 | A | 4/1994 | Lagana |
| 5,306,432 | A | 4/1994 | Puetz |
| 5,316,031 | A | 5/1994 | Brazelton et al. |
| 5,320,748 | A | 6/1994 | Dupuis |
| 5,332,511 | A | 7/1994 | Gay et al. |
| 5,348,665 | A | 9/1994 | Schulte et al. |
| 5,352,359 | A | 10/1994 | Nagai et al. |
| 5,382,367 | A | 1/1995 | Zinkan et al. |
| 5,422,013 | A | 6/1995 | Hirofuji |
| 5,422,014 | A | 6/1995 | Allen et al. |
| 5,424,032 | A | 6/1995 | Christensen et al. |
| 5,443,991 | A | 8/1995 | Godec et al. |
| 5,470,480 | A | 11/1995 | Gray et al. |
| 5,489,344 | A | 2/1996 | Martin et al. |
| 5,494,588 | A | 2/1996 | LaZonby |
| 5,501,801 | A | 3/1996 | Zhang et al. |
| 5,518,629 | A | 5/1996 | Perez et al. |
| 5,571,419 | A * | 11/1996 | Obata ....................... C02F 9/00 210/686 |
| 5,573,662 | A | 11/1996 | Abe et al. |
| 5,575,920 | A | 11/1996 | Freese et al. |
| 5,587,069 | A | 12/1996 | Downey, Jr. |
| 5,639,476 | A | 6/1997 | Oshlack et al. |

(56) References Cited

U.S. PATENT DOCUMENTS

| | | |
|---|---|---|
| 5,658,467 A | 8/1997 | LaZonby et al. |
| 5,675,153 A | 10/1997 | Snowball |
| 5,683,654 A | 11/1997 | Dallmier et al. |
| 5,720,869 A | 2/1998 | Yamanaka et al. |
| 5,736,097 A | 4/1998 | Ono |
| 5,753,106 A | 5/1998 | Schenck |
| 5,770,039 A | 6/1998 | Rigney et al. |
| 5,779,912 A | 7/1998 | Gonzalez-Martin et al. |
| 5,783,092 A | 7/1998 | Brown et al. |
| 5,785,845 A | 7/1998 | Colaiano |
| 5,785,867 A | 7/1998 | LaZonby et al. |
| 5,790,934 A | 8/1998 | Say et al. |
| 5,798,271 A | 8/1998 | Godec et al. |
| 5,800,732 A | 9/1998 | Coughlin et al. |
| 5,814,233 A | 9/1998 | Starkey et al. |
| 5,814,247 A | 9/1998 | Derule et al. |
| 5,820,256 A | 10/1998 | Morrison |
| 5,849,985 A | 12/1998 | Tieckelmann et al. |
| 5,855,791 A | 1/1999 | Hays et al. |
| 5,858,246 A | 1/1999 | Rafter et al. |
| 5,858,249 A | 1/1999 | Higby |
| 5,866,013 A | 2/1999 | Kessler et al. |
| 5,873,997 A | 2/1999 | Kaplan |
| 5,882,526 A | 3/1999 | Brown et al. |
| 5,888,374 A | 3/1999 | Pope et al. |
| 5,895,565 A | 4/1999 | Steininger et al. |
| 5,902,751 A | 5/1999 | Godec et al. |
| 5,947,596 A | 9/1999 | Dowd |
| 5,972,196 A | 10/1999 | Murphy et al. |
| 5,980,758 A | 11/1999 | LaZonby et al. |
| 5,985,155 A | 11/1999 | Maitland |
| 6,015,484 A | 1/2000 | Martinchek et al. |
| 6,030,842 A | 2/2000 | Peachey-Stoner |
| 6,045,706 A | 4/2000 | Morrison et al. |
| 6,063,638 A | 5/2000 | Small et al. |
| 6,068,012 A | 5/2000 | Beardwood et al. |
| 6,083,387 A | 7/2000 | LeBlanc et al. |
| 6,090,296 A | 7/2000 | Oster |
| 6,096,283 A | 8/2000 | Cooper et al. |
| 6,106,770 A | 8/2000 | Ohki et al. |
| 6,120,619 A | 9/2000 | Goudiakas et al. |
| 6,120,698 A | 9/2000 | Rounds et al. |
| 6,132,593 A | 10/2000 | Tan |
| 6,143,184 A | 11/2000 | Martin et al. |
| 6,146,538 A | 11/2000 | Martin |
| 6,149,819 A | 11/2000 | Martin et al. |
| 6,159,552 A | 12/2000 | Riman et al. |
| 6,238,555 B1 | 5/2001 | Silveri et al. |
| 6,284,144 B1 | 9/2001 | Itzhak |
| 6,315,950 B1 | 11/2001 | Harp et al. |
| 6,409,926 B1 | 6/2002 | Martin |
| 6,419,817 B1 | 7/2002 | Martin |
| 6,420,715 B1 | 7/2002 | Cormack et al. |
| 6,423,234 B1 | 7/2002 | Martin |
| 6,444,474 B1 | 9/2002 | Thomas et al. |
| 6,461,519 B1 | 10/2002 | Weltzer |
| 6,464,867 B1 | 10/2002 | Morita et al. |
| 6,468,433 B1 | 10/2002 | Tribelski |
| 6,503,464 B1 | 1/2003 | Miki et al. |
| 6,596,148 B1 | 7/2003 | Belongia et al. |
| 6,620,315 B2 | 9/2003 | Martin |
| 6,623,647 B2 | 9/2003 | Martin |
| 6,645,400 B2 | 11/2003 | Martin |
| 6,716,359 B1 | 4/2004 | Dennis, II |
| 6,773,608 B1 | 8/2004 | Hallett et al. |
| 6,776,926 B2 | 8/2004 | Martin |
| 6,780,238 B2 | 8/2004 | Park |
| 6,780,328 B2 | 8/2004 | Zhang |
| 6,884,391 B1 | 4/2005 | Khoe et al. |
| 6,902,653 B2 | 6/2005 | Carmignani et al. |
| 6,942,779 B2 | 9/2005 | Belongia et al. |
| 6,991,733 B2 | 1/2006 | Kin et al. |
| 6,991,735 B2 | 1/2006 | Martin |
| 7,097,764 B2 | 8/2006 | Neofotistos |
| 7,108,781 B2 | 9/2006 | Martin |
| 7,285,223 B2 | 10/2007 | Martin |
| 7,320,756 B2 | 1/2008 | Mukhopadhyay |
| 7,507,973 B2 | 3/2009 | Bircher |
| 8,357,305 B2 | 1/2013 | Theodore et al. |
| 8,459,861 B2 | 6/2013 | Bircher |
| 8,580,091 B2 | 11/2013 | Niksa et al. |
| 8,652,336 B2 | 2/2014 | Sitkiewitz et al. |
| 8,741,155 B2 | 6/2014 | Coulter |
| 2001/0007314 A1 | 7/2001 | Sherman |
| 2002/0043650 A1 | 4/2002 | Martin |
| 2002/0117631 A1 | 8/2002 | Gadgil et al. |
| 2002/0152036 A1 | 10/2002 | Martin |
| 2002/0153319 A1 | 10/2002 | Mukhopadhyay |
| 2003/0010695 A1 | 1/2003 | Kool et al. |
| 2003/0019803 A1 | 1/2003 | Woodard et al. |
| 2004/0005242 A1 | 1/2004 | Koulik et al. |
| 2004/0112838 A1 | 6/2004 | Martin |
| 2004/0154965 A1 | 8/2004 | Baum et al. |
| 2005/0029170 A1 | 2/2005 | Urquhart et al. |
| 2005/0056597 A1 | 3/2005 | Fries et al. |
| 2005/0103717 A1 | 5/2005 | Jha et al. |
| 2005/0139530 A1 | 6/2005 | Heiss |
| 2005/0173341 A1 | 8/2005 | Salinaro |
| 2005/0199483 A1 | 9/2005 | Kroll |
| 2005/0218082 A1 | 10/2005 | Williamson et al. |
| 2005/0263716 A1 | 12/2005 | From et al. |
| 2006/0124558 A1* | 6/2006 | Kouame .................. C02F 1/50 |
| | | 210/764 |
| 2006/0131245 A1 | 6/2006 | Dennis et al. |
| 2006/0169646 A1 | 8/2006 | Andree et al. |
| 2007/0090051 A1 | 4/2007 | Minegishi et al. |
| 2007/0102359 A1 | 5/2007 | Lombardi et al. |
| 2007/0119779 A1 | 5/2007 | Muramoto et al. |
| 2008/0149485 A1 | 6/2008 | Childers et al. |
| 2008/0152548 A1 | 6/2008 | Clark et al. |
| 2008/0179242 A1 | 7/2008 | Mukhopadhyay |
| 2008/0245738 A1 | 10/2008 | Coulter |
| 2009/0084734 A1 | 4/2009 | Yencho |
| 2009/0145855 A1 | 6/2009 | Day et al. |
| 2009/0194486 A1 | 8/2009 | Martin |
| 2010/0025337 A1 | 2/2010 | Yencho |
| 2010/0078574 A1 | 4/2010 | Cooper et al. |
| 2010/0118301 A1 | 5/2010 | Vondras et al. |
| 2010/0292844 A1 | 11/2010 | Wolf |
| 2011/0010835 A1 | 1/2011 | McCague |
| 2011/0024361 A1 | 2/2011 | Schwartzel et al. |
| 2011/0024365 A1 | 2/2011 | Yong et al. |
| 2011/0171080 A1 | 7/2011 | Lo |
| 2011/0180485 A1 | 7/2011 | Sitkiewitz et al. |
| 2011/0209530 A1 | 9/2011 | Coulter |
| 2011/0210048 A1 | 9/2011 | Coulter |
| 2011/0210077 A1 | 9/2011 | Coulter |
| 2011/0210266 A1 | 9/2011 | Coulter |
| 2011/0210267 A1 | 9/2011 | Coulter |
| 2011/0243665 A1 | 10/2011 | Theodore et al. |
| 2011/0259832 A1 | 10/2011 | Castillo Rivera et al. |
| 2011/0318237 A1 | 12/2011 | Woodling et al. |
| 2012/0048744 A1 | 3/2012 | Kim et al. |
| 2014/0144821 A1 | 5/2014 | Sitkiewitz et al. |
| 2014/0263092 A1 | 9/2014 | Sanchez Cano et al. |

FOREIGN PATENT DOCUMENTS

| | | |
|---|---|---|
| CN | 1539750 | 10/2004 |
| CN | 1625433 A | 6/2005 |
| CN | 201473358 U | 5/2010 |
| DE | 262139 C | 11/1988 |
| DE | 4312417 A1 | 10/1994 |
| DE | 19530086 A1 | 2/1997 |
| DE | 19844179 A1 | 3/2000 |
| DE | 19949434 A1 | 4/2001 |
| EP | 0011776 A1 | 6/1980 |
| EP | 0257740 A1 | 3/1988 |
| EP | 0504621 A1 | 9/1992 |
| EP | 0616975 A2 | 9/1994 |
| EP | 1057784 A1 | 12/2000 |
| EP | 1188473 A1 | 3/2002 |
| EP | 1237820 A1 | 9/2002 |
| EP | 1340719 A2 | 9/2003 |

(56) References Cited

FOREIGN PATENT DOCUMENTS

| | | |
|---|---|---|
| FR | 2672058 A1 | 7/1992 |
| GB | 2027004 A | 2/1980 |
| GB | 2281742 A | 3/1995 |
| GB | 2306463 A | 5/1997 |
| GB | 2426513 A | 11/2006 |
| JP | 59-150589 | 8/1984 |
| JP | 60-202792 A | 10/1985 |
| JP | 11-28479 A | 2/1999 |
| JP | 11-033542 A | 2/1999 |
| JP | 11-057752 A | 3/1999 |
| JP | 11-099395 A | 4/1999 |
| JP | 11-290878 A | 10/1999 |
| LU | 80951 A1 | 6/1979 |
| TW | 419440 B | 1/2001 |
| WO | 89/08728 A1 | 9/1989 |
| WO | 95/15294 | 6/1995 |
| WO | 96/30307 A1 | 10/1996 |
| WO | 00/34760 A1 | 6/2000 |
| WO | 01/98558 A2 | 12/2001 |
| WO | 03/031338 A2 | 4/2003 |
| WO | 2004/108607 A1 | 12/2004 |
| WO | 2007/146671 A2 | 12/2007 |
| WO | 2008150541 A1 | 12/2008 |
| WO | 2009/096662 A2 | 8/2009 |

OTHER PUBLICATIONS

FMC Environmental Solutions, "Activated Persulfate Chemistry: Combined Oxidation and Reduction Mechanisms," Peroxygen Talk, Oct. 2010.

Notification of Transmittal of the International Search Report and the Written Opinion of the International Searching Authority for International Application No. PCT/US11/35813, dated Jul. 22, 2011.

Notification of Transmittal of the International Search Report and the Written Opinion of the International Searching Authority for International Application No. PCT/US12/21424, dated Jun. 26, 2012.

Notification of Transmittal of the International Search Report and the Written Opinion of the International Searching Authority for International Application No. PCT/US2010/043809, dated Jan. 28, 2011.

Nowell, Lisa H. et al., "Photolysis of Aqueous Chlorine at Sunlight and Ultraviolet Wavelengths-II. Hydroxyl Radical Production," Water Research, vol. 26, No. 5, May 26, 1992, pp. 599-605, Marsh Barton, Exeter, Great Britain.

Pool and Spa Controller: Acu-200 Pool Management Software, Product Literature (date unknown).

Rola-Chem Corporation, "The New Wave in Water Management: Take Control with Rola-Chem," Product Catalog, Apr. 1999.

Ryan, D. et al., "Waste Not, Want Not: Avoiding Chemical Excesses," reprinted from Operations Forum, vol. 11, No. 4, Apr. 1994.

Sadik W/ & G. Shama, Uv-induced Decolourization of an Azo Dye by Homogeneous Advanced Oxidation Process, pp. 310-313, 2002.

Santa Barbara Control Systems, "Chemtrol™ PC Programmable Controllers: Integrated Water Treatment with Remote Control," Product Literature, (date unknown).

Scully et al., Disinfection Interference in Wastewaters by Natural Organic Nitrogen Compounds, Environ. Sci. Techn., vol. 30, No. 5, 1996, pp. 1465-1471.

Selvick, E., "Take Control of 'Yo-Yo' Treatment Cycles," International Aquatics, National Trade Publications, Inc., Jul./Aug. 1997.

SG201200605-2 Examination Report in Singapore, dated Jun. 5, 2013.

Singapore Search Report dated Jul. 18, 2012 for corresponding Singapore Application No. 201103322-2.

Singapore Written Opinion dated Feb. 22, 2013 for corresponding Singapore Application No. 201200605-2 (11 pages).

Stranco, "Solutions: Effluent Dechlorination", Stranco Product Literature (date unknown).

Stranco, "The Best of Poolfax," The Poolfax Newsletter, 1981-1984.

Strand, R. et al., "ORP As a Measure of Evaluating and Controlling Disinfection in Potable Water," (Source and date unknown).

U.S. Filter/Stranco, "Abstracts of Strancol ECS Case Histories," (date unknown).

U.S. Filter/Stranco, "Air & Water Quality Control for Indoor Aquatic Facilities," U.S. Filter Corporation, 1998.

U.S. Filter/Stranco, "ECS-Pool (w/CHF-150) Engineering Packet," Apr. 22, 1999.

U.S. Filter/Stranco, "Environmental Control at Indoor Pool Complex: New ECS System Optimizes Air & Water Quality at Colorado Recreation Center," Stranco Products Capsule Case History #807, Nov. 1998.

U.S. Filter/Stranco, "Environmental Control at Indoor Pool: ECS System Eliminates Chronic Air Quality Problems at High School and Parks District Indoor Pool Facility," Stranco Products Capsule Case History #813, Jul. 2000.

U.S. Filter/Stranco, "Environmental Control at Indoor Pool: ECS System Optimizes Air & Water Quality at Iowa Recreation Center," Stranco Products Capsule Case History #814, May 2000.

U.S. Filter/Stranco, "Environmental Control at Indoor Pool: ECS System Optimizes Air & Water Quality at Texas School District Swim Center," Stranco Products Capsule Case History #811, Nov. 1999.

U.S. Filter/Stranco, "Environmental Control at Indoor Pool: New ECS System Eliminates Chronic Air Quality Woes For New York School District Pool," Stranco Products Capsule Case History #806, Jul. 1998.

U.S. Filter/Stranco, "Environmental Control at Indoor Pool: Parks District Uses New ECS System to Eliminate Chronic Air Quality Problems at High School Pool," Stranco Products Capsule Case History #808, May 1999.

U.S. Filter/Stranco, "Environmental Control at Special Indoor Pool: New ECS System Eliminates Chronic Air Quality Woes in School District Pool & Spa Serving Special Needs Children," Stranco Products Capsule Case History #812, Oct. 1999.

U.S. Filter/Stranco, "Environmental Control System Training Meeting, Mar. 15, 2000".

U.S. Filter/Stranco, "Remote Monitoring for Unstaffed Pools," Parks & Recreation, Nov. 1997.

U.S. Filter/Stranco, "Ryznar Stability Index The 3rd Dimension Needed for Proper 'Water Balance,'" Aquatic Technology Newsletter, vol. 1, No. 1, pp. 1-3 (undated).

U.S. Filter/Stranco, "Strantrol Automated Water Chemistry Control for Commercial Pools," 1998.

U.S. Filter/Stranco, "Strantrol ECS—Environmental Control System (For Pool)," 2000.

U.S. Filter/Stranco, "Strantrol System 3 Pool & Spa Chemistry Controller," 2000.

U.S. Filter/Stranco, "Strantrol System 4 Pool & Spa Chemistry Controller," 2000.

U.S. Filter/Stranco, "Strantrol System5F Pool & Spa Chemistry Controller," 2000.

U.S. Filter/Stranco, "Strantrol System6 Pool Chemistry & Filter Backwash Controller," 2000.

U.S. Filter/Stranco, "Strantrol System7 Mechanical Room Controller for Aquatic Facilities," 2000.

U.S. Filter/Stranco, "The Chemistry and Control of Chloramines," Aquatic Technology Newsletter, vol. 1, No. 4, 1999, pp. 1-5.

U.S. Filter/Stranco, "The Relationship of ORP to PPM and Its Automated Control," Aquatic Technology Newsletter, vol. 1, No. 3, 1999, pp. 1-5.

U.S. Filter/Stranco, "Total Dissolved Solids, Friend or Foe?", Aquatic Technology Newsletter, vol. 1, No. 2, 1988; pp. 1-7.

U.S. Filter/Stranco, "Why Do I Have Algae In My Pool?" Aquatic Technology Newsletter, vol. 1, No. 6, 1999, pp. 1-2.

U.S. Filter/Stranco, "Yes, Your Pool Needs Calcium Too," Aquatic Technology Newsletter, vol. 1, No. 5, pp. 1-3 (undated).

Victorin et al., "Redox potential measurements for determining the disinfecting power of chlorinated water," J. Hyg., Camb., 70, 1972, pp. 313-323.

(56) References Cited

OTHER PUBLICATIONS

White, Geor. Clifford, Handbook of Chlorination and Alternative Disinfectants, Third Edition, (date unknown), pp. 801, 803-809, 922-924.
Williams, K., "Aquatic Facility Operator Manual," National Recreation and Park Association, Second Edition, 1995.
Yu et al., Free Radical Reactions Involving Cl*, Cl2-*, and SO4-* in the 248 nm Photolysis of Aqueous Solutions Containing S2O82- and Cl-, J. Phys. Chem. A 2004, 108, 295-308.
Taiwanese Examination Report dated Mar. 12, 2014 for Application No. 101101705 (with translation).
Singapore Search Report dated Apr. 11, 2014 for Application No. 201304569-5.
Singapore Written Opinion dated Apr. 11, 2014 for Application No. 201304569-5.
Liu, et al, "In Situ Chemical Oxidation of Contaminated Groundwater by Persulfate: Decomposition by Fe(III- and Mn (IV)-Containing Oxides and Aquifer Materials," Environ. Sci. Technol., pp. 10330-10336, 2014.
Acu-Trol Programmable Controllers, "AT-8 Programmable Chemical Controller," Product Literature, 2006.
Acu-Trol, "Acu-Trol Programmable Controllers: AK100 Series and AK200," Product Literature (date unknown).
Acu-Trol, "AK100 Summary," Product Literature from www.acu-trol.com, printed Nov. 19, 1999.
Anipsitakis, George P. et al., "Transition Meta/UV-based Advanced Oxidation Technologies for Water Decontamination," Applied Catalysis B: Environmental 54 (2004), pp. 155-163.
Aquasol Controllers, Inc., "Aquasol SPC Specifications," Product Literature from www.aquasol.com, printed Nov. 19, 1999.
Aquasol Controllers, Inc., "Aquasol WTC Specifications," Product Literature from www.aquasol.com, printed Nov. 19, 1999.
Aquasol Controllers, Inc., "What is a Controller?" Product Literature from www.aquasol.com, printed Nov. 19, 1999.
Aquasol Controllers: Chemical Automation for Pools and Spas, Product Literature (date unknown).
"Acu-Trol Programmable Controllers," Product Literature from www.acu-trol.com, printed Nov. 19, 1999.
"AK100 Swimming Pool Control Systems," Product Literature from www.acu-trol.com, printed Nov. 19, 1999.
"Chemtrol—PC3000 Controller," Product Literature from www.sbcontrol.com, printed Nov. 19, 1999.
"Chemtrol—PC6000 Controller," Product Literature from www.sbcontrol.com, printed Nov. 19, 1999.
"Louisiana Plant Uses New Technology for Dechlorination," reprinted from American City & County, Feb. 1994.
Batt, T. et al., "The Water Down Under," Parks & Recreation, Nov. 1999.
Bossard, G. et al., "Optimizing Chlorination/Dechlorination at a Wastewater Treatment Plant," reprinted from Public Works, Jan. 1995.
Brusamarello et al., "Analysis of Different Methods to Calculate Electrochemical Noise Resistance Using a Three-Electrode Cell," Corrosion, vol. 56, No. 3, Mar. 2000, pp. 273-282.
Carlson, S., "Fundamentals of water disinfection," J Water SRT—Aqua, vol. 40, No. 6, (1991), pp. 346-356.
Carpenter, Colleen et al., "Chlorine Disinfection of Recreational Water for *Cryptosporidium parvum*," Emerging Infectious Diseases, vol. 5, No. 4, Jul.-Aug. 1999, pp. 579-584.
CAT Controllers, "CAT 2000+ Programmable Water Chemistry Controller," Product Literature (date unknown).
Chemtrol Automatic Pool Controllers, Product Literature from www.sbcontrol.com, printed Nov. 19, 1999.
Chinese First Office Action dated Mar. 11, 2013 for Application No. 201080034061.X.
Cooper, J.F. et al., Final Report: Fiscal Year 1997 Demonstration of Omnivorous Non-Thermal Mixed Waste Treatment Direct Chemical Oxidation of Organic Solids and Liquids using Peroxydisulfate, Lawrenec Livermore National Laboratory, Jan. 1998.

D'Adam, D. et al., "A Case Study of Wastewater Plant Disinfection," reprinted from Public Works Magazine, Nov. 1994.
Dexter et al., "Use and Limitations of Electrochemical Techniques for Investigating Microbiological Corrosion", Corrosion, 1991, vol. 47, No. 4, pp. 308-318.
Eddington, Gordon, "Successfully Managing Wastewater Chlorination," Stranco Product Literature (date unknown).
Examination Report dated May 23, 2013 for Taiwanese Application No. 096145308.
Frazier, B., "Automation to the Rescue," Aquatics International, May/Jun. 1998.
Gusmano et al., "Electrochemical Noise Resistance as a Tool for Corrosion Rate Prediction", Corrosion, 1997, vol. 53, No. 11, pp. 860-868.
Hensley, R. et al., "Disinfection Metamorphosis: From Chemicals to Control," Operations Forum, vol. 12, No. 4, Apr. 1995.
Hetzler, J.T. et al., "ORP: A Key to Nutrient Removal," Operations Forum, vol. 12, No. 2, Feb. 1995.
Invitation to Respond to Written Opinion dated Jun. 20, 2013 for corresponding Singapore Application No. 201103322-2.
Kim, Yong H., "Evaluation of Redox Potential and Chlorine Residual as a Measure of Water Disinfection," presented at the 54th International Water Conference, Pittsburgh, PA, Oct. 11-13, 1993.
Kim, Yong H., "On the Activation of Polymeric Flocculants," AIChE Annual Spring Meeting, Houston, TX, Apr. 2-6, 1989.
Kiser, P. et al., "ORP or Residual: Which Measures Oxidation?" Sep. 10, 1992, pp. 1-7.
Kloberdanz, B., "The Air in There: Enhancing an Indoor Pool Environment," Recreation Management, 2000.
Kowalsky, L., "Pool-Spa Operators Handbook," National Swimming Pool Foundation, 1983-1990.
Krone, D., "Automated Water Chemistry Control at University of Virginia Pools," Facilities Manager, vol. 13, No. 6, Nov./Dec. 1997.
Lund et al., "The Effect of Oxidation and Reduction on the Infectivity of Poliomyelitis Virus," from the Virological Laboratory of the Department of Bacteriology, University of Gothenburg, and the Virological Department of the Municipal Laboratories, Gothenburg, Sweden, Springer-Verlag, (1961), pp. 100-110.
Lund, E., "Inactivation of Poliomyelitis Virus by Chlorination at Different Oxidation Potentials," from the Virological Laboratory of the Department of Bacteriology, University of Gothenburg, and the Virological Department of the Municipal Laboratories, Gothenburg, Sweden, Springer-Verlag, (1961), pp. 330-342.
Lund, E., "Oxidative Inactivation of Poliovirus," from the Virological Laboratory of the Department of Bacteriology, University of Gothenburg, and the Virological Department of the Municipal Laboratories, Gothenburg, Sweden, Springer-Verlag, (1963), pp. 1-49.
Lund, E., "The Rate of Oxidative Inactivation of Poliovirus and its Dependence on the Concentration of the Reactants," from the Virological Laboratory of the Department of Bacteriology, University of Gothenburg, and the Virological Department of the Municipal Laboratories, Gothenburg, Sweden, Springer-Verlag, (1963), pp. 1-18.
Lund, E., "The Significance of Oxidation in Chemical Inactivation of Poliovirus," from the Virological Laboratory of the Department of Bacteriology, University of Gothenburg, and the Virological Department of the Municipal Laboratories, Gothenburg, Sweden, Springer-Verlag, (1963), pp. 1-13.
Lynntech, Inc., "Electrochemical Ozone Generator," Model 124 Product Literature (date unknown).
Mansfeld et al., "Electrochemical Noise Analysis of Iron Exposed to NaCl Solutions of Different Corrosivity," J. Electrochem. Soc., vol. 141, No. 5, May 1994, pp. 1402-1404.
Mikkelson, Ken, et al., "Development of the AquaMB ProcessTM", Aqua-Aerobic Systems, Inc., 2003.
Minton, E., "On the Waterpark," Swimming Pool/Spa Age (date unknown).
Normenausschusse Wasserwesen, "Treatment and disinfection of water used in bathing facilities," DIN 19643-1, Apr. 1997.
Normenausschusse Wasserwesen, "Treatment and disinfection of water used in bathing facilities," DIN 19643-2, Apr. 1997.

(56) References Cited

OTHER PUBLICATIONS

Normenausschusse Wasserwesen, "Treatment and disinfection of water used in bathing facilities, " DIN 19643-3, Apr. 1997.
Normenausschusse Wasserwesen, "Treatment and disinfection of water used in bathing facilities," DIN 19643-4, Feb. 1999.

* cited by examiner

ULTRAVIOLET LIGHT ACTIVATED OXIDATION PROCESS FOR THE REDUCTION OF ORGANIC CARBON IN SEMICONDUCTOR PROCESS WATER

RELATED APPLICATIONS

This application is a continuation-in-part of pending U.S. patent application Ser. No. 12/303,596, filed Dec. 5, 2008, and titled ULTRAVIOLET LIGHT ACTIVATED OXIDATION PROCESS FOR THE REDUCTION OF ORGANIC CARBON IN SEMICONDUCTOR PROCESS WATER, which patent application is a national stage entry under 35 U.S.C. § 371 of PCT/US07/70416 filed Jun. 5, 2007, and titled ULTRAVIOLET LIGHT ACTIVATED OXIDATION PROCESS FOR THE REDUCTION OF ORGANIC CARBON IN SEMICONDUCTOR PROCESS WATER which claims priority to U.S. Provisional Application Ser. No. 60/811,220 filed Jun. 6, 2006, and titled ULTRAVIOLET LIGHT ACTIVATED OXIDATION PROCESS FOR THE REDUCTION OF TOTAL ORGANIC CARBON IN ULTRAPURE WATER, which patent applications are hereby incorporated herein by reference in their entireties for all purposes.

FIELD OF THE DISCLOSURE

The present disclosure generally relates to a process for the purification of water used in semiconductor manufacturing. More specifically, the present disclosure relates to a process that uses ultraviolet activated persulfate to decompose organic compounds in both pure and spent process water streams in semiconductor manufacturing facilities.

BACKGROUND

Reducing TOC in water using ultraviolet light activated aqueous persulfate is known. It is an established method of decomposing organic compounds in water and is discussed in, for instance, U.S. Pat. No. 4,277,438, to Ejzak, which teaches a batch process of preparing water samples for the measurement of TOC by: (1) persulfate addition, (2) irradiation with an extreme dose of UV (which also heats the sample) to activate the persulfate to oxidize any TOC to carbon dioxide and water. U.S. Pat. No. 5,443,991, by Godec et al, teaches a similar method.

U.S. Pat. No. 5,571,419, to Obata et al, discloses a method of producing Ultra Pure Water (UPW) having a low concentration of organic matter. The purification method requires the following process for the water to be treated: (1) pH adjustment to less than 4.5, (2) addition of an oxidizing agent (such as a persulfate salt), (3) heating of the water to preferably a minimum of 110° C. and more preferably to 120° to 170° C., and (4) cooling the water to the temperature required for use.

The prior art also includes references showing an advanced oxidation process to destroy organic compounds in wastewater, including U.S. Pat. No. 5,762,808, to Peyton, and U.S. Pat. No. 6,096,283 to Cooper et al.

However, despite improvements in this technology, there remains a need for an improved method of producing a reliable, continuous source of low TOC UPW for the semiconductor industry and other industries that require ultrapure water with controlled total organic carbon. The present disclosure describes UV activation of persulfate salt to produce high oxidation potential radicals at ambient temperature, in non-pH adjusted water to purify UPW prior to discharge from the Point of Distribution (POD), prior to the Point of Connection (POC) (typically labeled as the Point of Use or POU), and to purify spent UPW for reuse on a continuous basis.

SUMMARY

This disclosure is a process used for the decomposition of carbon-containing compounds in water. This process reduces total organic carbon (TOC) in water through the addition of a persulfate salt upstream of an ultraviolet light source. The ultraviolet light is absorbed by the persulfate—converting the persulfate into sulfate radicals. The sulfate radicals oxidize TOC, converting the contributing compounds into $CO_2$ and mineral salts.

This disclosure describes the use of the UV/persulfate oxidation process for the purification of water used in semiconductor manufacturing and the production of UPW in general.

The process uses a standard photochemical reactor either a plug flow (PFR) or a stirred tank (CSTR) or a combination of both. The most cost-effective design is expected to be a CSTR with immersed UV lamps. Multiple reactors can be used in series to improve reagent utilization.

A method of reducing TOC in semiconductor process water is disclosed.

Other features of the disclosure, regarding organization and method of operation, together with further objects and advantages thereof will be better understood from the following description considered in connection with the accompanying drawings, in which embodiments of the disclosure are illustrated by way of example. It is to be expressly understood, however, that the drawings are for illustration and description only and are not intended as a definition of the limits of the disclosure. The various features of the disclosure are pointed out with particularity in the claims annexed to and forming part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DETAILED DESCRIPTION

Figure 1A:
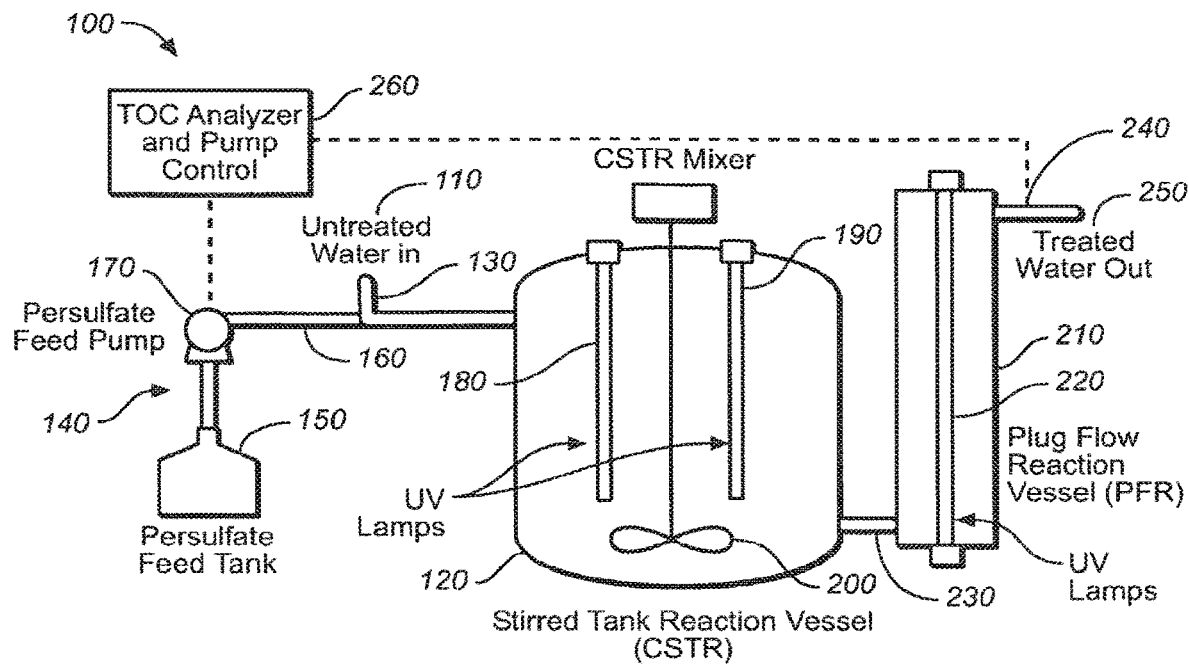
FIG. 1A is a schematic view of an advanced oxidation system in accordance with one or more embodiments.

Referring to FIGS. 1 through 4, wherein like reference numerals refer to like components in the various views, FIG. 1A is a schematic view showing the elements comprising the UV activated oxidation process for reducing organic carbon in semiconductor process water, generally denominated AOP 100 herein. TOC decomposition performance is controlled by the size of the reaction vessel, the intensity and amount of UV light used, and the amount of persulfate injected. The system configuration includes a source of untreated water 110, which is fed into a chemical reactor vessel 120 through one or more fluid inlets 130. Persulfate from a persulfate anion addition system 140 is also fed into the reactor vessel, the system including a persulfate feed tank 150, a fluid inlet 160, and a feed pump 170. One or more UV lights 180, 190 are disposed within the vessel enclosure, as is a chemical solution mixer 200.

The reactor vessel may be a continuous-stirred tank reactor (CSTR). This keeps down cost and increases system simplicity. However, a plug flow reactor (PFR) may be preferred in situations where space (system footprint) is at a premium. Alternatively, a CSTR can be used in series with a PFR 210 having UV lights 220 to increase system efficacy.

The treated water is discharged either directly (in the case of a single reactor system) through one or more discharge outlets 230 for further use, or into the PFR for further treatment and subsequent discharge from a terminal discharge outlet 240. The treated water 250 is sampled at discharge by a TOC analyzer 260, which adjusts and controls the persulfate feed pump 170 according to the needs of the system.

Figure 1B:
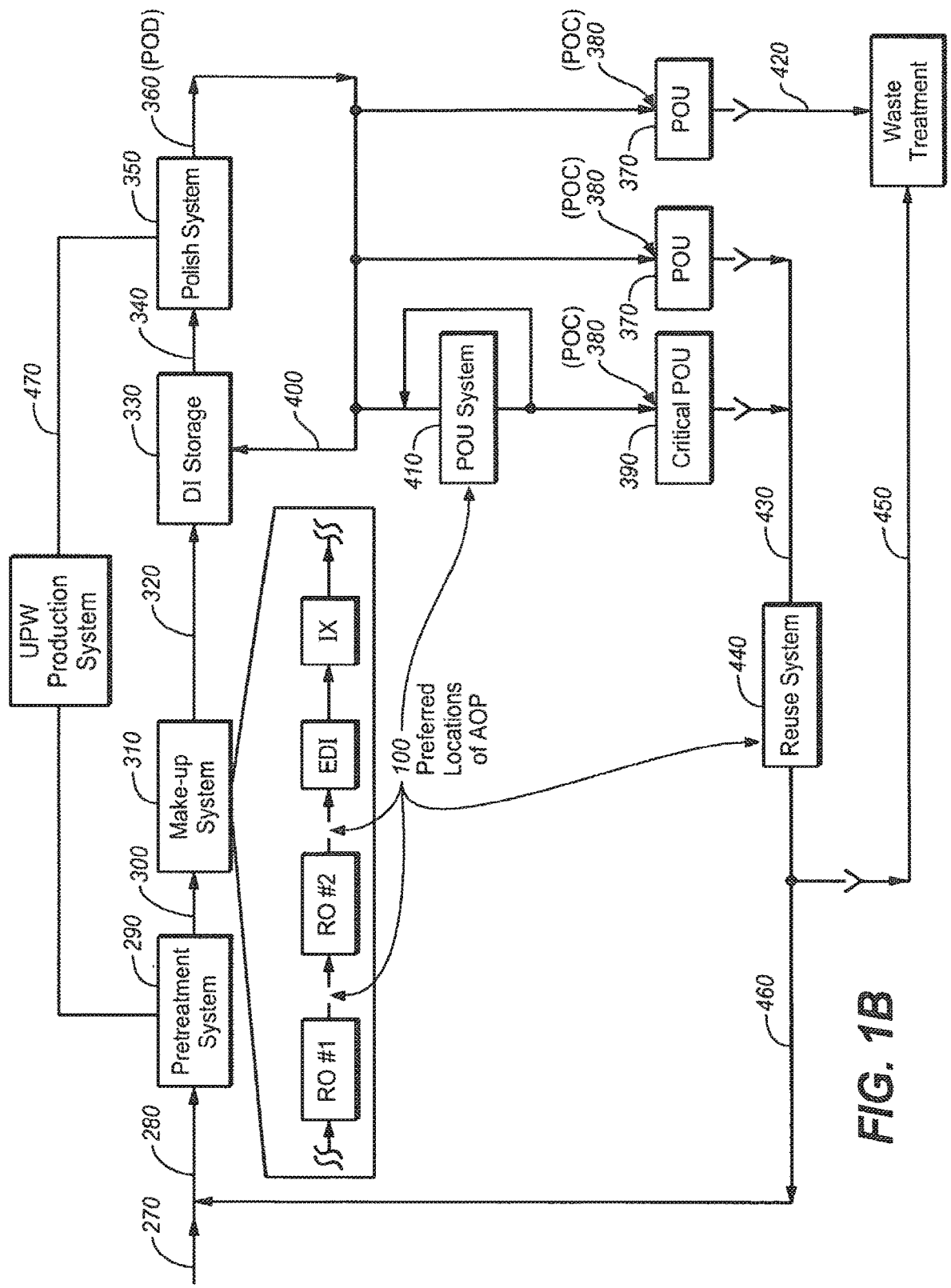
FIG. 1B is a block schematic diagram of a semiconductor industry UPW system showing possible locations in which the advanced oxidation system could be employed in accordance with one or more embodiments.

FIG. 1B shows AOP 100 implementation in a typical semiconductor UPW production system 470 when employed in the production of UPW prior to the POD 360 and also prior to the POC 380 to produce ultra low level TOC (i.e. <POD level) for critical POU usage 390. FIG. 1B also shows AOP 100 implementation when employed in the purification of spent UPW 440 from semiconductor fabrication.

Treated reuse UPW 460 can be blended with raw feed water 270 to produce the required blended feed flow 280 to the UPW production system 470. Alternatively, the treated reuse UPW 460 can be blended with UPW at any point within the UPW production system 470. The Pretreatment System treats the blended feed flow by combining various technologies, as required, for suspended solids reduction, initial organic compound reduction, chlorine removal and pH adjustment to produce feed water 300 with the proper characteristics for efficient production of UPW in the Make-Up System 310. The Make-Up System process typically includes Heat Exchange (HX), Ultra-Filtration (UF), Membrane Filtration (MF), $1^{st}$ Pass Reverse Osmosis (RO), $2^{nd}$ Pass RO, Electro-deionization (EDI), Ion Exchange (IX), Membrane De-Aeration (MD-A) or Vacuum De-Aeration (VD-A), and UV Sterilization (UV) to produce the required Make-Up water quality 320 with a flow equal or greater than the total average usage at the POU (370 plus 390). Make-Up water stored in DI Storage 330 provides limited backup when the Make-Up System is out of service or when the average POU UPW usage exceeds the capacity of the Make-Up System. UPW from DI Storage is pumped 340 through the Polish System 350 at a flow rate greater than UPW peak usage at the combined POU. UPW in the Polish System is purified using HX, EDI, IX, UV, MF, and UF to produce UPW per POD 360 quality specifications as required at the non-critical POU 370. Certain critical fab processes 390, such as photolithography, require UPW with an impurity level less than produced at the POD 360. To meet this requirement, POU System(s) 410 are installed at the POC(s) to the critical fab process(es). The POU System can include HX, RO, EDI, IX, MD-A, pressure control, UV, MF, and UF, as required to meet fab-specific UPW specifications at the POC(s). The sum of non-critical and critical fab UPW usage equals the combined fab UPW usage. UPW not used at the combined POU is returned 400 to DI Storage. Certain fab UPW usage produces spent UPW water not economically suitable for reuse 420 (due to high levels of suspended solids, chemicals, etc.) that is sent to waste treatment. Most spent UPW 430 is primarily contaminated with TOC that can be purified in a Reuse System 440 and forwarded 460 for blending with raw feedwater 270. Water not meeting specifications for blending 450 is sent to waste treatment.

The AOP 100 can be employed at any point in the UPW production system 470, consisting of the Pretreatment System, the Make-Up System, the DI Storage, and the Polish System.

The AOP 100 in the UPW production system 470 may be located on the product stream of the $1^{st}$ Pass RO. At this point the feedwater to the AOP 100 has significantly reduced levels of suspended solids, ionized solids, microorganisms, and TOC, all of which enhance the performance of the AOP 100. The TOC in the AOP 100 product should be controlled so that the TOC at the POD 360 and non-critical POU 370 is less than specification. Product water from AOP 100 is directed to following unit processes in the UPW production system 470, where oxidation products from the AOP process are removed.

The AOP 100 can be employed at any point between the POD 360 and the POC 380 to critical POU 390 to reduce TOC to the specification required by POU 390. Additional unit processes, similar to those found in the UPW production system 470 may be employed to remove oxidation products produced in the AOP 100, or to meet other specifications for the POU 390 not achieved with UPW delivered from the POD 360.

The AOP 100 can be employed in the Reuse System 440 to reduce TOC in segregated, spent UPW 430 to produce Reuse UPW 460 suitable for reuse in the UPW System or for other uses. Suspended solids reduction in the reuse feedwater 430 using MF or UF may be employed to improve the efficiency of the AOP 100. Ionized solids reduction using RO, EDI, or IX in part of, or all of the Reuse UPW 460 may be employed to meet use specifications of the Reuse UPW.

As an alternative or addition to a feed back signal from a TOC/TDS analyzer disposed on the effluent discharge, a feed forward signal to the persulfate addition system may be supplied by a TOC analyzer disposed on the inlet end of the water to be treated. The performance of the reactor is a function of the following design parameters: (1) residence time; (2) reactor radius (light path length); (3) lamp linear energy density; (4) energy wavelength; (5) persulfate concentration; and, (6) TOC composition and concentration.

The reactor design is selected after determining the amount of persulfate that needs to decompose to effect the required TOC decomposition. The persulfate decomposition fraction and addition rate is established by optimizing the design parameters for capital cost, operating cost and available footprint.

The decomposition of persulfate to sulfate radicals and the subsequent reaction of the radicals with organic compounds is a homogeneous set of reactions. The longer the fluid retention time in the reactor, the greater the amount of activating UV light absorbed. Thus, residence time affects the fraction of the feed persulfate that will be decomposed and, consequently, the amount of organic material that will be oxidized.

Increasing the reactor radius increases the residence time and increases the distance between the lamps and the reactor walls. The incremental reactor volume further from the lamps is less effective for persulfate decomposition due to lower photon flux. However, because the light must pass through more water, more photons are absorbed, resulting in better use of the input UV. The effect of increased reactor radius is then a function of the effective absorption of the water. If the water absorbs little of the light, then increasing the reactor radius has a larger impact on performance. The residence time varies as a square of the radius, but because the view factor scales inversely with the distance from the lamp, photon flux varies as 1/r. Accordingly, if UV power is relatively more expensive than tank size, the tank radius should be set so that little UV light reaches the tank walls.

The effect of light energy input, or linear energy density of the lamp, is also straightforward. As more light is added to the reactor more persulfate will be decomposed. The amount of persulfate decomposed generally scales linearly with energy input. Energy input can be varied by changing the number of lamps used and the choice of lamp. For example, a standard low pressure mercury lamp, used for both photolysis and biological control, has a 254 nm output of about 0.2 W/cm. Amalgam lamps are available that give 0.4 and 0.6 W/cm. And medium pressure mercury lamps typically give 15 W/cm in the 200-260 nm range.

Figure 2:
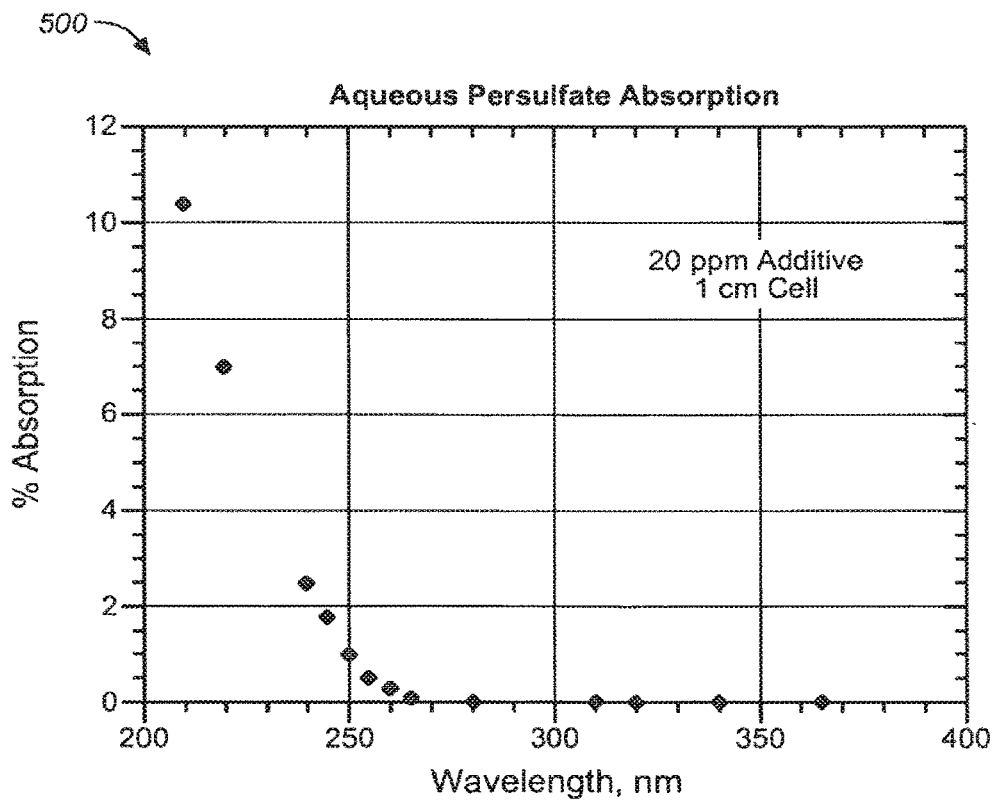
FIG. 2 is a graph showing the absorption spectrum for aqueous persulfate.

The wavelength of light employed is also a critical design variable. FIG. 2 graphically shows the absorption spectrum 500 for aqueous persulfate. As shown in FIG. 2, persulfate absorbs a larger fraction of light as the wavelength is reduced. At 254 nm very little of the light is absorbed. Using 220 nm light would result in much more light absorption for a given path-length. Adjusting the UV to a wavelength where persulfate absorbs stronger improves performance in situations where some fraction of the light is not absorbed before reaching the reactor vessel wall. The extra absorbed light translates directly to more persulfate decomposed and improved performance. A lower limit on wavelength is set by the water absorption of photons which occurs strongly below ~190 nm.

For a given reactor design, the TOC decomposition performance depends on the feed rate of persulfate. The amount of persulfate required for a given performance depends on: (a) specific chemicals contributing to TOC; (b) concentration of these chemicals; and (c) TOC decomposition performance required.

The amount of persulfate needed is also affected if there are other chemicals in the water that absorb UV (lowering the effective quantum efficiency of persulfate degradation) or that are oxidized by sulfate radicals (thus competing with TOC for sulfate radicals.) Generally, cleaner water allows for more efficient TOC control.

The method may be demonstrated by the following examples, which are provided for purposes of illustration only, and do not limit the scope of the disclosure described herein.

Example 1

Tests indicate that for a given target chemical the absolute reaction rate is low order in the target chemical concentration. A given persulfate feed rate and UV power generates a number of radicals which, over a narrow target chemical concentration, decompose a fixed amount of the target compound independent of the concentration of the target compound.

Figure 3:
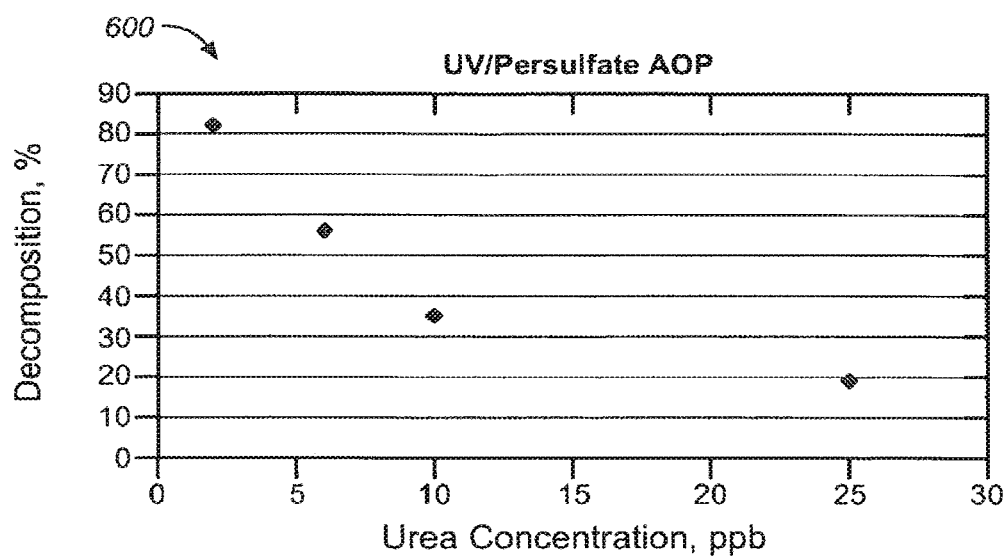
FIG. 3 is a graph showing the effect of urea concentration on decomposition performance for plug flow reactor, with persulfate at 0.5 ppm and a 0.9 minute residence time.

FIG. 3 graphically shows the effect of urea concentration on performance for a fixed residence time and persulfate feed rate 600. The data were generated using a plug flow reactor with a 254 nm lamp. The data show that the absolute amount of urea decomposed at 10 ppb was only twice that decomposed at 2 ppb. As with other AOPs, some oxidant-to-target molar ratio will be required to achieve a required performance. This affect contrasts with many chemical processes where the reaction rate scales proportionally to the target chemical concentration.

These data are an example of using the process to remove a relatively difficult to oxidize compound from an ultra-pure water stream.

Example 2

A series of tests was conducted to test the stirred tank (CSTR) design concept with simulated spent rinse water. Isopropanol (IPA) was used as the target compound since it has been shown to be difficult to decompose and is a major component of spent rinse water. The objective of the study was to determine if 1-5 ppm TOC could be reduced to <5 ppb.

Figure 4:
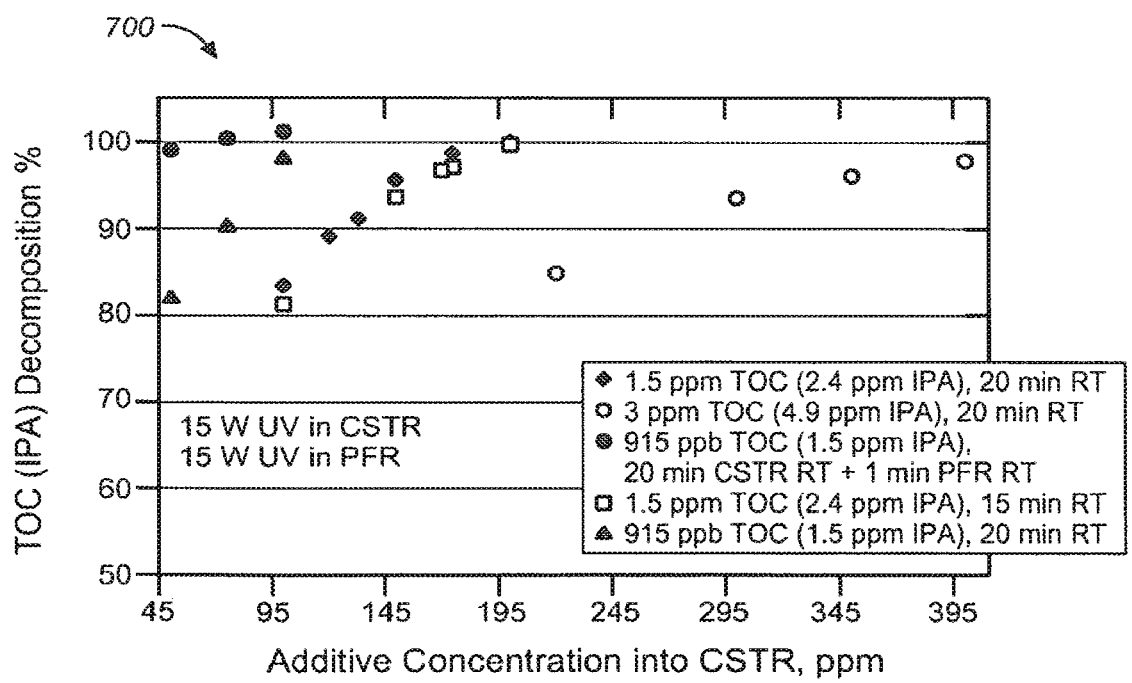
FIG. 4 is a graph showing the results of a simulated pilot test of the system to treat spent rinse water in accordance with one or more embodiments.

The results 700 of the pilot study are summarized as FIG. 4. The results can be organized by the three IPA concentrations examined. Note that there is a difference between IPA concentration and TOC concentration; IPA is only 60% carbon so 1.5 ppm IPA is equivalent to 915 ppb TOC.

Low IPA Tests—At the lowest IPA concentration tested (1.5 ppm), the persulfate addition required to achieve the target effluent TOC is reasonable. The effect of increased additive addition on performance is linear up to 100% IPA decomposition with a single 20 minute residence time CSTR. By adding a one minute residence time plug flow reactor (PFR) in series after the CSTR, the performance is improved by decomposing the residual persulfate. In other words, some of the additive is not decomposed in the CSTR and is passed on and decomposed in the PFR. Additive addition of 75 ppm is sufficient to destroy essentially all of the IPA with the two reactors in series.

Moderate IPA Tests—The relationship between persulfate addition and IPA decomposition is also linear at the moderate TA concentration (2.4 ppm) tested. Nearly 100% decomposition is achieved using 200 ppm persulfate using the 20 minute residence time CSTR. The additive requirements are increased somewhat when the residence time of the CSTR is decreased to 15 minutes.

High IPA Tests—At the highest IPA concentration (4.9 ppm) the amount of persulfate required to achieve the 99+% decomposition requirement is significant. The relationship between additive addition and decomposition performance is also not linear. The effect of higher persulfate concentrations on performance is diminished as 100% decomposition is approached. Although this IPA concentration is higher than is expected for the intended application, the ability to attain near complete decomposition for higher IPA concentrations in water gives a desirable flexibility to the process.

Collectively, these tests show that the technology is viable for spent rinse water treatment using a simple CSTR photochemical reactor of sufficient residence time and modest UV energy input.

The disclosure herein shows that a system directed to treating semiconductor process water to reduce total organic compounds in the water. The system includes a chemical reactor vessel and a persulfate anion addition system upstream of the chemical reactor vessel, and employs light energy to oxidize the aqueous persulfate. It may be used to treat pure water for semiconductor manufacturing, and to decompose TOC to less than 5 ppb, or to below 1 ppb. However, it may also be employed to treat semiconductor-manufacturing wastewater, and in such an implementation, it is used to decompose TOC to a concentration sufficiently low to allow reuse of the water. In each implementation, the persulfate feed rate is controlled by a TOC analyzer based on a feed back signal from effluent TOC analysis. Alternatively, it may be controlled by a feed forward signal from analysis of the TOC in the untreated feed water. In yet another alternative, it may be controlled by both.

Further, a method is provided for treating semiconductor process water to reduce total organic compounds, and this method comprises the steps of (1) providing a source of semiconductor manufacturing water with a TOC concentration higher than required for ultrapure uses; (2) mixing aqueous persulfate anions with the semiconductor manufacturing water in a chemical reactor vessel; (3) exposing the persulfate anion and water mixture to ultraviolet light for a predetermined residence time; and (4) discharging the treated water for further treatment required for ultrahigh purity uses. The method may be used when the semiconductor manufacturing water is pure water, and the process may be employed to decompose TOC to less than 5 ppb, or to less than 1 ppb. Furthermore, the method may be used in treating semiconductor manufacturing waste water, and the process is used to decompose TOC to a concentration sufficiently low to allow reuse of the water, and further processing may be effected to remove dissolved solids and dissolved gases.

In effecting the process, the introduction of persulfate into the reaction vessel may be controlled using either a feed back signal from effluent TOC analysis, or a feed forward signal from analysis of the TOC in the untreated feed water, or both. In the former case, the TOC analyzer would be disposed between the source of water to be treated and the chemical reactor vessel, and in the latter, the TOC analyzer would be disposed anywhere downstream of the chemical reactor vessel, including on the discharge outlet itself or anywhere prior to the point of use or re-use.

While the particular apparatus and method herein shown and disclosed in detail is fully capable of attaining the objects and providing the advantages stated herein, it is to be understood that it is merely illustrative of an embodiment and that no limitations are intended concerning the detail of construction or design shown other than as defined in the appended claims.

Accordingly, the proper scope of the present disclosure should be determined only by the broadest interpretation of the appended claims so as to encompass obvious modifications as well as all relationships equivalent to those illustrated in the drawings and described in the specification.

The invention claimed is:

1. A water treatment system, comprising:
a source of water for semiconductor manufacturing;
a point of use fluidly connected downstream of the source of water; and
an advanced oxidation process system fluidly connected downstream from the source of water for semiconductor manufacturing, the advanced oxidation process system comprising:
a chemical reactor vessel;
a persulfate addition system fluidly connected to the chemical reactor vessel;
a light emitting device positioned within the chemical reactor vessel; and
a total organic carbon analyzer configured to receive an input signal of a total organic carbon measurement, the total organic carbon analyzer further configured to provide an output signal to control the persulfate addition system in response to the input signal.

2. The water treatment system of claim 1, wherein the persulfate addition system comprises a persulfate feed tank and a persulfate feed pump fluidly connected to the persulfate feed tank, wherein the persulfate feed pump is configured to deliver persulfate to the chemical reactor vessel.

3. The water treatment system of claim 2, further comprising a polish system with at least one of a heat exchanger, an electro-deionization unit, an ion exchange unit, an ultraviolet sterilization system, a membrane filtration unit, and an ultra-filtration membrane.

4. The water treatment system of claim 3, wherein the source of water for semiconductor manufacturing comprises at least one of a source of raw feed water, a source of spent ultrapure water, and a blended feed comprising a mixture of the raw feed water and the spent ultrapure water.

5. The water treatment system of claim 4, further comprising a pretreatment system fluidly connected to the source of water, the pretreatment system including at least one of a suspended solids removal system, an organic compound reduction system, a chlorine removal system, a pH adjustment system, and a carbon dioxide reduction system.

6. The water treatment system of claim 5, further comprising a deionized water storage system fluidly connected upstream of the polish system.

7. The water treatment system of claim 6, wherein the advanced oxidation process system is fluidly connected upstream of the polish system.

8. The water treatment system of claim 6, wherein the advanced oxidation process system is positioned within the polish system.

9. The water treatment system of claim 6, wherein the advanced oxidation process system is fluidly connected downstream of the polish system.

10. The water treatment system of claim 6, wherein the total organic carbon analyzer is disposed upstream of the chemical reactor vessel.

11. The water treatment system of claim 10, wherein the total organic carbon analyzer is further configured to provide the output signal to increase the persulfate delivered to the chemical reactor vessel in response to the input signal indicating that the total organic carbon measurement exceeds 5 ppb.

12. The water treatment system of claim 10, wherein the total organic carbon analyzer is further configured to provide the output signal to increase the persulfate delivered to the chemical reactor vessel in response to the input signal indicating that the total organic carbon measurement exceeds 1 ppb.

13. The water treatment system of claim 6, further comprising a make-up system with a first-pass reverse osmosis unit and a second-pass reverse osmosis unit, and wherein the advanced oxidation process system is fluidly connected downstream of the first-pass reverse osmosis unit and upstream of the second-pass reverse osmosis unit.

* * * * *